C. C. NUCKOLS & F. PRUYN.
ELECTRICAL RESISTANCE.
APPLICATION FILED JUNE 29, 1910.
1,019,075.
Patented Mar. 5, 1912.
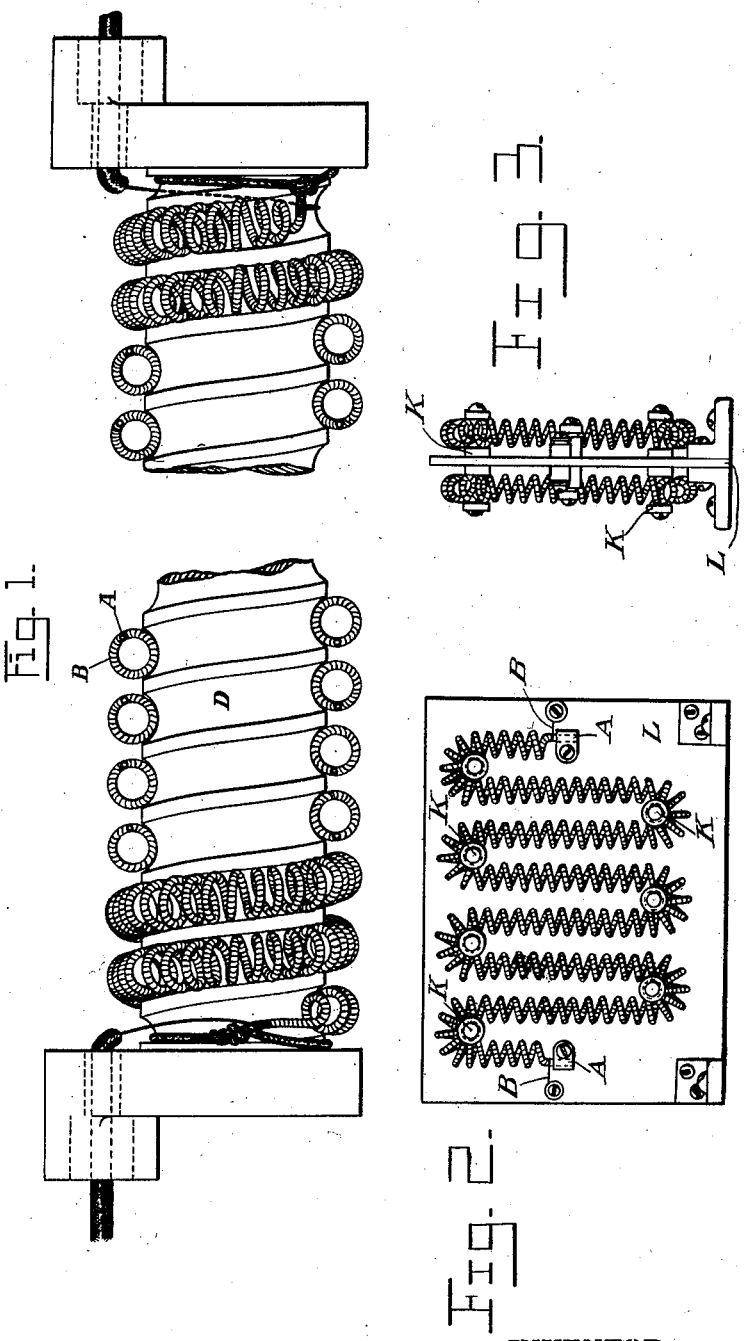
WITNESSES:
L. J. Shaw
C. B. Titus
INVENTOR
Claude C. Nuckols
Frederic Pruyn
BY
E. M. Brutters ATTY

UNITED STATES PATENT OFFICE.

CLAUDE C. NUCKOLS AND FREDERIC PRUYN, OF ALBANY, NEW YORK, ASSIGNORS TO CONSOLIDATED CAR HEATING COMPANY, A CORPORATION OF WEST VIRGINIA.

ELECTRICAL RESISTANCE.

1,019,075. Specification of Letters Patent. Patented Mar. 5, 1912.

Application filed June 29, 1910. Serial No. 569,537.

*To all whom it may concern:*

Be it known that we, CLAUDE C. NUCKOLS and FREDERIC PRUYN, citizens of the United States, residing at Albany, county of Albany, State of New York, have invented certain new and useful Improvements in Electrical Resistances, the following being a full, clear, and exact disclosure of the one form of our invention which we at present deem preferable.

For a detailed description of the present form of our invention, reference may be had to the following specification and to the accompanying drawings which illustrate our invention.

Figure 1 illustrates one form of our invention. Fig. 2 is a view in side elevation of another form of the invention. Fig. 3 is a view in end elevation of the form of the invention shown in Fig. 2.

Our invention is particularly designed for an electrical resistance in which an extremely fine wire is employed, such as is necessary for signaling and other apparatus used on electric railway vehicles, where the voltage is high and the amount of energy needed for the apparatus is small. In resistances of this kind the fine wire is difficult to insulate and support by reason of its minute diameter and lack of mechanical strength, while it is also difficult to handle it without breaking it.

The invention consists in employing as the basis of the resistance structure a much larger wire or rod capable of being bent and coiled into any one of the various shapes in which it is customary to coil electrical conducting wires for resistances and heaters. This wire does not, however, form a part of the electric circuit, but is in the nature of a mechanical self-sustaining support. I take such a supporting wire and coat it with a flexible, refractory and water-proof material, such as asbestos impregnated with a solution which, when baked, will become hard and form a strong, tough insulation of high resistance and at the same time will be sufficiently flexible. For example, the insulating material known as "armalac" will serve this purpose, though we do not desire to be limited to any specific material, so long as it has the qualities heretofore stated. Upon a wire or a rod thus insulated, we wind the fine resistance-wire. This winding should be sufficiently open to prevent contact of adjacent turns and to permit adequate exposure. The resisting wire may be bare wire which avoids the necessity of coating the extremely small wire with insulation. The ends of the resistance-wire will be properly secured and then the supporting wire, with the resistance-wire thereon, may be bent or coiled into any desirable compact form. A number of the ways in which it may be thus disposed are shown in the accompanying drawings.

Turning to Fig. 1 of the drawings, A represents the supporting wire covered with a coating of insulating material in the manner described, outside of which is wound the fine resistance-wire B. The supporting wire A is in this case coiled into a long spiral which is wrapped spirally around a portion of the core D in the way that the resistance-wire itself is wound in the well known McElroy electric heater. The ends of the supporting wire are secured by tie-cords and the resistance-wire is provided with suitable connections for the current. In this construction the supporting wire A will form self-sustained spirals wherein the effect of expansion and contraction will be taken up in the individual turns, while each turn has only a small point of contact with the underlying porcelain support. This provides for an adequate exposure of the resistance-wire, free from any troubles from expansion and contraction. It will also be observed that the supporting wire A is in such close relation to the resistance-wire wound thereon as to receive the heat from the resistance-wire and conduct it from those points of the resistance-wire which are in immediate contact with the porcelain core and distribute it throughout those portions of the supporting-wire spirals which are out of contact with the porcelain and exposed to the air. In other words, the supporting wire acts to distribute the heat which otherwise might accumulate at the points of the high resistance-wire which are in contact with the porcelain support and thereby less exposed to the atmosphere. This is a feature of importance, since such a fine resistance wire, incapable of transmitting in itself a considerable degree of heat, tends to overheat and become oxidized at those points where it may be covered by coming in contact with a point of support, such as the porcelain cylinder of Fig. 1.

In Figs. 2 and 3 the supporting wire A with the resistance wire therein is first bent into a long spiral, as in Fig. 1, and the spiral then arranged in zigzag form upon a series of insulating pins K. These pins are preferably arranged on both sides of a plate L as clearly appears in Fig. 6 and the spirals applied to both sides thereof and said pins retain the spirals in spaced relation.

By the above described arrangement fine resistance wire such as No. 34 B. and S. can be supported in great lengths in a simple, effective and compact manner with a minimum amount of trouble in the handling, supporting and insulating of the resistance-wire. Moreover at all points the resistance wire has to a large extent the advantage of the heat conducting capacity of the supporting wire or rod A. The wire A can be bent and coiled in a variety of self-supporting arrangements, the stiffness of the wire itself serving to maintain the air spaces between adjacent turns in a way that would be impossible with the resistance-wire alone. In brief, the arrangement gives to the extremely fine wire all of the mechanical advantages inherent in a much larger and stiffer wire and at the same time enables a great length of fine wire to be brought within a small compass, the supporting wire having the mechanical strength which the fine wire lacks.

What we claim as new and desire to secure by Letters Patent is:

1. An electric resistance comprising a supporting wire coiled into relatively small convolutions, the coiled wire being further bent to form larger convolutions in which the smaller convolutions are maintained undisturbed, insulating material on said wire, a resistance wire wound around said insulating material, and insulating means for sustaining said larger convolutions in spaced apart relation.

2. An electric resistance comprising a supporting wire coiled into relatively small convolutions, the coiled wire being further bent to form larger convolutions in which the smaller convolutions are maintained undisturbed, insulating material on said wire, a resistance wire wound around said insulating material, and an insulating member to which the ends of said supporting wire are secured, said member being provided with means for sustaining said larger convolutions in spaced apart relation.

3. An electric resistance comprising a supporting wire coiled into relatively small convolutions, the coiled wire being further bent to form larger convolutions in which the smaller convolutions are maintained undisturbed, insulating material on said wire, a resistance wire wound around said insulating material, and an insulating core provided with helical grooves to receive said larger convolutions.

In witness whereof we have hereunto set our hands, before two subscribing witnesses, this 27th day of June, 1910.

CLAUDE C. NUCKOLS.
FREDERIC PRUYN.

Witnesses:
JOHN M. ESTERLY,
CLARENCE PALMER.